March 8, 1927.
L. H. GILLICK
FLEXIBLE JOINT
Original Filed July 26, 1920
1,620,094
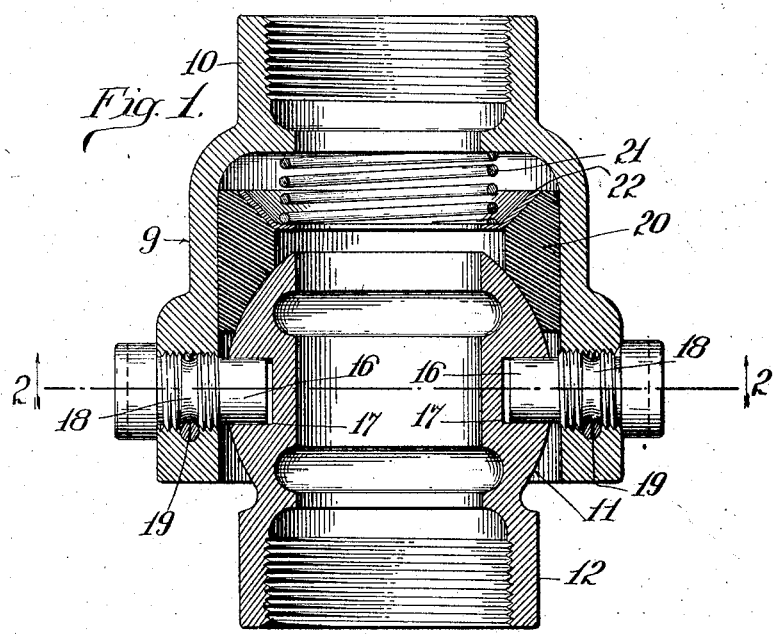
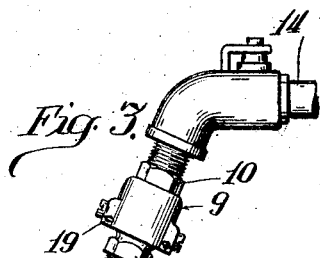
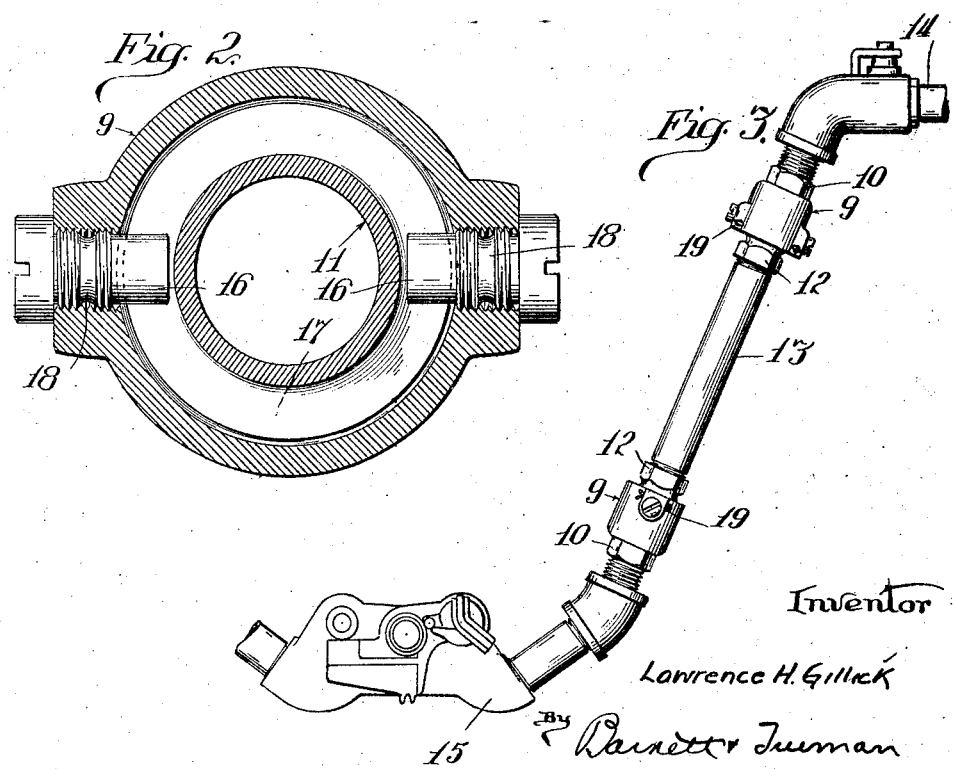
Inventor
Lawrence H. Gillick
By Barnett & Truman
Attorneys Patented Mar. 8, 1927.

1,620,094

UNITED STATES PATENT OFFICE.

LAWRENCE H. GILLICK, OF ST. PAUL, MINNESOTA, ASSIGNOR TO VAPOR CAR HEATING COMPANY, INC., OF CHICAGO, ILLINOIS, A CORPORATION OF NEW YORK.

FLEXIBLE JOINT.

Original application filed July 26, 1920, Serial No. 398,882. Divided and this application filed July 2, 1925. Serial No. 41,054.

My invention relates to flexible couplings or pipe joints of the type employing ball and socket members, the joint being intended especially for conduits subject to rather high internal fluid pressure. The primary objects of the invention are: to provide a joint which will be flexible even when the fluid pressure therein is very high, and which will also be fluid tight and so remain after continued periods of service; to provide a joint which can be re-packed, when necessary, without disconnecting the flexible joint structure entirely from the conduit or pipe line with which it is associated; to provide a joint, the members of which will have a wider range of angular movement than possessed by the usual so-called universal joints; to provide a simple arrangement whereby the members of the joint will have capacity for swivel movement, as between each other, as well as angular movement; to construct and dispose the parts of the joint so that the weight of the parts is not imposed on the packing, whereby easy flexibility is insured and the packing has capacity for self-adjustment under fluid or spring pressure, or both, against the ball members of the joint; and in other respects to be hereinafter noted, to provide an improved flexible joint for use on railway trains, for example, in place of the usual rubber hoses connecting the train pipe sections or in other situations where lightness, compact structure, strength and flexibility over wide ranges are requisite.

The invention is illustrated in certain preferred embodiments, in the accompanying drawing:

Fig. 1 is a longitudinal sectional view through my improved joint structure.

Fig. 2 is a transverse section taken on line 2—2 of Fig. 1; and

Fig. 3 is a fragmentary view in side elevation showing a train line connection comprising my improved flexible joint structure.

Referring to the several figures of the drawings,—9 indicates a socket member of internally cylindrical form and provided with a neck portion 10 at one end. Within the socket member 9, I have provided a ball or globular member 11, which in turn is provided with a neck portion 12 at its outer end. In Fig. 3 I have shown a portion of an all-metal flexible pipe connection between the steam train pipes of two railway cars and embodying my improved construction. In this construction, two of the flexible joint structures are employed, connected together by means of a pipe 13, this structure being interposed between a train pipe 14 and a hose coupler 15.

The ball member 11 is held adjustably in position within the socket 9 by means of inwardly extending pins 16 carried by the socket member and extending at diametrically opposite sides into a groove 17 extending completely about the ball member 11, the arrangement being such that the ball is able to have either a swinging motion about the pins 16 or a swiveling motion about the longitudinal axis of the socket, the ball being adapted to turn completely about with respect to the socket by reason of the provision of the groove 17 extending completely about the ball. As is best shown in Fig. 1, each of the pins 16 is provided with a circumferentially extending groove 18 in which is mounted at one side a cotter pin 19 which normally prevents withdrawal or loosening of the pins 16.

Between the inner end of the socket member 9 and the inner end of the ball member 11, I have provided a packing member or gasket 20 slidably mounted within the socket member and having a curved end surface bearing against the adjacent curved face of the ball member. This gasket is to be formed of rubber, rubber composition or other material of a type that is soft and resilient as compared with the metal parts of the device, or of a type that will soften under the influence of heat under conditions such as exist in a train pipe joint in use.

While fluid pressure, especially when the joint is used on a steam or air line, will ordinarily be sufficient to keep the gasket in sealing contact with the ball member and the socket member, with the gasket extending a substantial distance inwardly from the ball to permit such sealing against the socket by radial expansion, I prefer to arrange a coiled spring 21 between the gasket and the adjacent portion of the socket member, the end of the gasket being preferably provided with an annular disc 22 for the spring to bear against. This spring serves to keep the gasket in proper condition when the joint is not subject to fluid pressure, as well as assisting in maintaining the desired pressure between the parts when the device is in use. The disc or ring 22 is conical in form, with a flange for the end of the spring 21, and it bears against a correspondingly beveled face on the end of the gasket so that the pressure of the spring not only forces the gasket in the direction of its length against the ball member 11 but also expands the inner end against the socket member 9, thus insuring close contact between the gasket and both the ball member and the socket member.

With a joint so constructed, the angular movement of the ball member with respect to the socket member may be considerable, because the socket member does not directly engage the ball member (the engagement between them being made by the pin and groove connection), so that the portions of the socket member limiting the angular movements of the ball member need not project beyond or even to the line of maximum transverse diameter of the ball member.

The pivotal connections between the socket member and the ball members takes the stress as between said members which results from the internal fluid pressure and also relieves the gasket of the weight of the parts of the joint. This gives the joint easy flexibility even when the internal pressure is high, since the articulated parts, the ball and socket members, do not bear on each other at all in the sense that the ordinary ball and socket members bear upon each other, the engagement between the socket and the balls being limited to the pivotal connections by which the friction is minimized. In this construction, the packing is self-feeding and self-adjusting against the surfaces of the ball members, so that wear on the gaskets does not bring about a leaky condition of the joint.

This application is being filed as a division of my co-pending application, Serial No. 398,882, filed July 26, 1920.

I claim:

1. A flexible joint comprising a socket member, a ball member extending into said socket but out of contact therewith, studs fixed to one of the members and projecting radially of the ball, the other member being provided with spaced opposing surfaces between which the studs are confined to prevent bodily movement of the ball into or out of the socket, but to permit swinging and rotational movements of the ball member with respect to the socket, a gasket slidably mounted in said socket and having a concaved bearing portion shaped to fit snugly the inner end of the ball member, and a spring interposed between the gasket and a portion of the socket for maintaining the gasket in operative contact with the ball member.

2. A flexible joint comprising an internally cylindrical socket member having a portion at one end of reduced interior diameter, a globular ball member extending into said socket but out of contact therewith, studs fixed to one of the members and projecting radially of the ball, the other member being provided with spaced opposing surfaces between which the studs are confined to prevent bodily movement of the ball into or out of the socket, but to permit swinging and rotational movements of the ball member with respect to the socket, an elongated annular gasket of material adapted to be soft and resilient when under the influence of steam slidably mounted in the socket and having a globularly concaved bearing portion adjacent to said ball member, and a spring interposed between the gasket and the reduced portion of the socket adapted yieldingly to maintain the gasket in operative snug engagement with the ball member.

3. A flexible joint comprising a socket member having a neck portion of reduced diameter, a ball member extending into said socket but out of contact therewith, studs fixed to one of the members and projecting radially of the ball, the other member being provided with spaced opposing surfaces between which the studs are confined to prevent bodily movement of the ball into or out of the socket, but to permit swinging and rotational movements of the ball member with respect to the socket, a gasket slidably mounted in said socket and having a concaved bearing portion shaped to fit snugly the inner end of the ball member, and a spring bearing against the reduced neck portion of the socket applying pressure to said gasket for pressing it longitudinally into contact with the ball member and radially into contact with the socket member.

4. A flexible joint comprising a socket member, a ball member extending into said socket but out of contact therewith, studs fixed to one of the members and projecting radially of the ball, the other member being provided with spaced opposing surfaces between which the studs are confined to prevent bodily movement of the ball into or out of the socket, but to permit a limited swinging motion and unlimited rotary motion of the ball member with respect to the socket member, and packing means adapted to form a tight joint between the two members.

5. A flexible joint comprising a socket member, a ball member extending into said socket but out of contact therewith, studs fixed to one of the members and projecting radially of the ball, the other member being provided with spaced opposing surfaces between which the studs are confined to prevent bodily movement of the ball into or out of the socket, but to permit a limited swinging motion and unlimited rotary motion of the ball member with respect to the socket member, a gasket slidably mounted in said socket and having a concaved bearing portion shaped to fit snugly the inner end of the ball member, and a spring mounted in said socket member and pressing said gasket yieldingly into contact with the ball member.

6. A flexible joint comprising a socket member, a ball member extending into said socket member but out of contact therewith, pivotal connections between said two members comprising a circumferential groove about one of said members and pins carried by the other member extending radially into said groove so as to permit substantially a complete rotation of one member with respect to the other, and packing means adapted to form a tight joint between the two members.

7. A flexible joint comprising a socket member, a ball member extending into said socket member but out of contact therewith, said ball member having a circumferential groove thereabout, pins carried by the socket member extending radially into said groove serving to connect said two members so as to permit a swinging motion and a rotary motion of the ball member with respect to the socket member while at the same time taking up the pressure of one member longitudinally of the other, and packing means adapted to form a tight joint between said two members.

8. A flexible joint comprising a socket member, a ball member extending into said socket member but out of contact therewith, pivotal connections between said two members comprising a circumferential groove about one of said members and pins carried by the other member extending radially into said groove so as to permit substantially a complete rotation of one member with respect to the other, a gasket slidably mounted in said socket and having a concaved bearing portion shaped to fit snugly the inner end of the ball member, and a spring mounted in said socket member and pressing said gasket yieldingly into contact with the ball member.

9. A flexible joint comprising an internally cylindrical socket member having a portion at one end of reduced interior diameter, a globular ball member extending into said socket but out of contact therewith, said ball member having a circumferential groove thereabout, pins carried by the socket member extending radially into said groove serving to connect said two members so as to permit a swinging motion and a rotary motion of the ball member with respect to the socket member while at the same time taking up the pressure of one member longitudinally of the other, an elongated annular gasket of material adapted to be soft and resilient when under the influence of steam slidably mounted in the socket and having a globularly concaved bearing portion adjacent to said ball member, and a spring interposed between the gasket and the reduced portion of the socket adapted yieldingly to maintain the gasket in operative snug engagement with the ball member.

LAWRENCE H. GILLICK.